Figure 1:
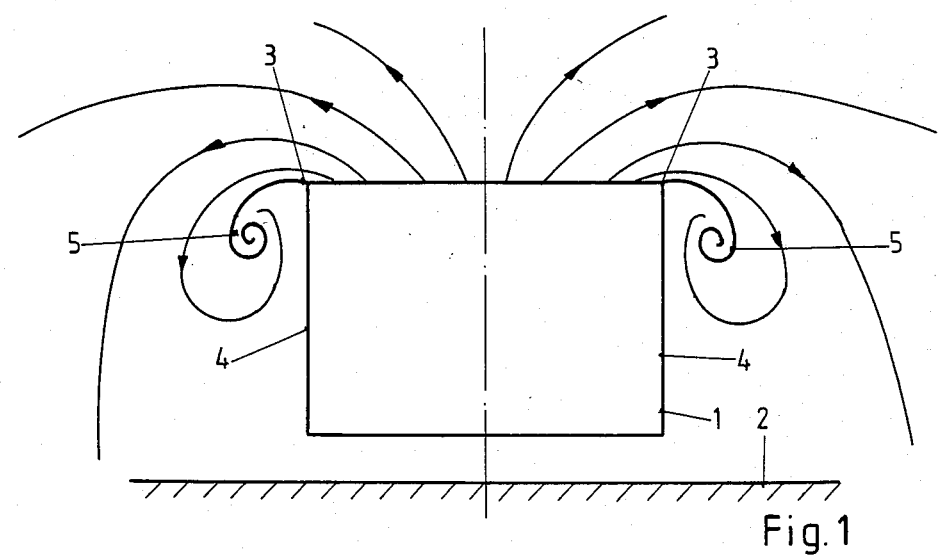

United States Patent [19]

Ludwig

[11] Patent Number: 4,505,507
[45] Date of Patent: Mar. 19, 1985

[54] CARRIAGE WITH ADVANTAGEOUS FLOW CHARACTERISTICS FOR VEHICLES

[75] Inventor: Hubert Ludwig, Göttingen, Fed. Rep. of Germany

[73] Assignee: Deutsche Forschungs- und Versuchsanstalt für Luft- und Raumfahrt e.V., Cologne, Fed. Rep. of Germany

[21] Appl. No.: 480,710

[22] Filed: Mar. 31, 1983

[30] Foreign Application Priority Data

Apr. 7, 1982 [DE] Fed. Rep. of Germany ....... 3212000

[51] Int. Cl.³ ............................................. B62D 35/00
[52] U.S. Cl. ..................................... 296/1 S; D12/86
[58] Field of Search ................. 296/1 S, 185; D12/86, D12/89, 82, 90, 85

[56] References Cited

U.S. PATENT DOCUMENTS

| D. 93,811 | 11/1934 | Billings | 296/1 S |
| D. 123,514 | 11/1940 | Thomas | 296/1 S |
| D. 245,494 | 8/1977 | Selvidge | D12/90 |
| 2,128,687 | 8/1938 | Andreau | 296/1 S |

Primary Examiner—Robert R. Song
Attorney, Agent, or Firm—Max Fogiel

[57] ABSTRACT

A carriage with advantageous flow characteristics for vehicles, especially automobiles, with a passenger compartment that has a more or less rectangular cross-section (13) and at least one sloping windshield (11). To reduce flow resistance the width of the body in front of and/or in back of the passenger compartment (13) varies in relation to its change in height in such a way that only a small flow around edge (flow across the upper longitudinal edge) occurs without any flow separation at all or with only insignificant separation.

8 Claims, 16 Drawing Figures

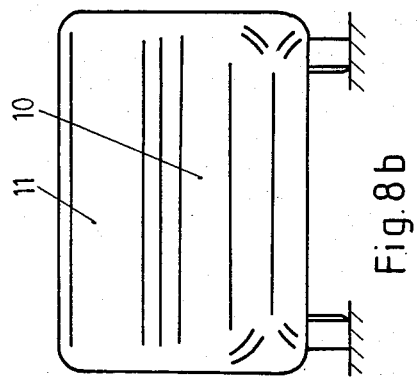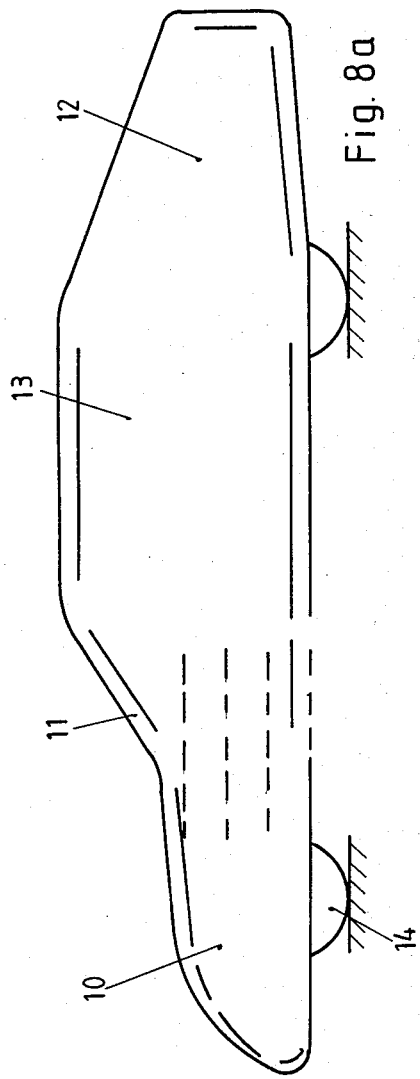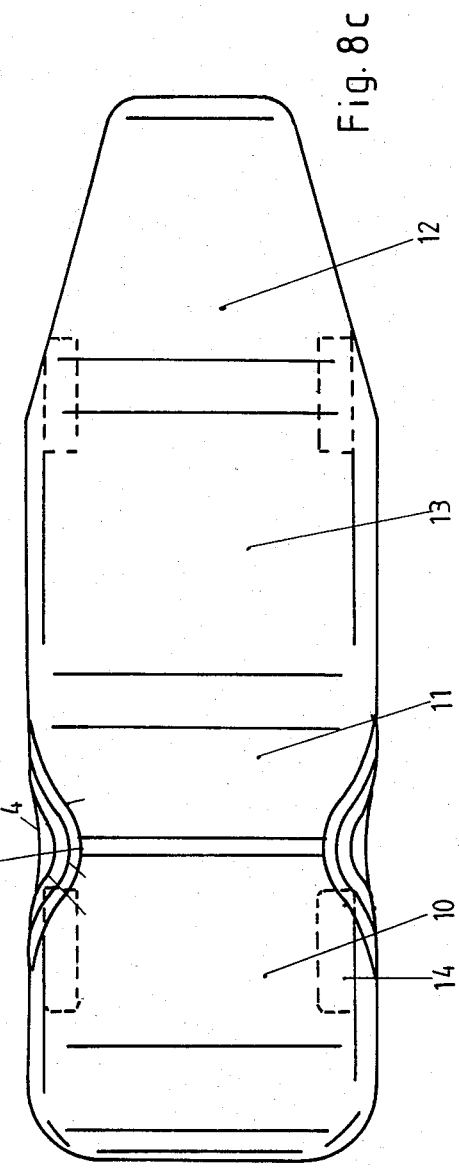

CARRIAGE WITH ADVANTAGEOUS FLOW CHARACTERISTICS FOR VEHICLES

The invention is a carriage with advantageous flow characteristics for vehicles, especially automobiles, of the type described in the preamble to claim 1.

Although the body ("carriage") of a vehicle of this type ought to have a drag coefficient ($C_W$) that is as low as possible, other demands must also be complied with for practical purposes. Side-wind sensitivity (side force and moment of yaw) must be as low as possible for example, and lift must be minimum. The body must also ensure adequate space and satisfactory front and rear vision while exhibiting a small front surface and not being too long.

The most prevalent shape for contemporary automobile bodies is the pontoon shape with various rear-end configurations like notchback, fastback, box-shaped, and sloping box-shaped. Motor vehicles with a pontoon shape and the conventional rear-end configurations have drag coefficients of approximately 0.4. Various measures for reducing the drag coefficient even further are known. It can for example be decreased by severely sloping the windshield and rear window, by rounding off all edges, and by avoiding projections and depressions. Approximating the shape of the body even closer to that of a teardrop-shaped streamlined body that differs from a pure, rotationally symmetrical, teardrop shape because it has to conform to the ground will decrease the drag coefficient even more. There are, however, disadvantages to these measures that prevent them from being employed. Side-wind sensitivity and lift, for example, can increase. Sloping windshields and rear windows can severely impede vision while simultaneously increasing solar irradiation, making the passenger compartment unacceptably hot. These measures can also increase the length of the vehicle, which is generally undesirable. Finally, and especially when the body is teardrop-shaped, the front surface of the vehicle can increase, which also results in a higher drag, although it may not be perceptible in the $C_W$.

The drag of a vehicle is partly made up of two components. It is determined on the one hand by the ideal basic shape of the body and on the other by components built onto and depressions in the body—wheels, wheel housings, bumpers, exhaust systems, rear-view mirrors, drip moldings, etc. The present invention relates to the drag component that derives from the body's basic shape.

The invention is intended as a flow-promoting vehicular body of the type described introductorily with an ideal basic shape that exhibits the lowest possible drag in order to reduce the overall drag of the type of vehicle in question.

The invention attains this objective in that the width of the body in front of and/or in back of the passenger compartment varies in relation to its change in height in such a way that only a small flow around edge (flow across the upper longitudinal edge) occurs without any flow separation at all or with only insignificant separation.

The point of departure for the invention is the fact, which is in itself known, that relatively high flows around edge occur accompanied by separations and eddy formation where the height of the body cross-section changes rapidly while its width remains approximately constant. This occurs in particular in conventional contemporary body shapes in the vicinity of the windshield and in that of the rear window or of the rear end as a whole. The present invention will allow only a small flow around edge without any flow separation at all or with only insignificant separation, thereby essentially decreasing drag. Since flow around edge is not in itself a drawback, especially in the immediate vicinity of the body, it is absolutely permissible within certain limits. It must, however, be restricted to a range within which significant separation does not occur. It is of course possible by increasing or decreasing the width in relation to change in the height of the body cross-section to create a shape that completely avoids lateral flow across the upper edges of the vehicle. The resulting shape, however, will be undesirable from other aspects and hence less practical. It is necessary, therefore, to make certain compromises—to allow a certain amount of flow around edge without departing from the overall basic design. Theoretical calculations and tests have indicated that the width of the cross-section must be significantly increased at the windshield and correspondingly decreased at the rear window to completely eliminated flow around edge. This leads to body shapes that, although they provide as much space in the passenger compartment as conventional shapes, are otherwise undesirable, especially with respect to front wheel track. These drawbacks can be avoided by varying the width at the windshield and/or rear window less rapidly than would be necessary to completely eliminate flow around edge.

When the ratio of height to width of the passenger compartment ranges from 1:1.2 to 1:1.3, the body can be widened laterally at the windshield by about 50–150% of the change in height at that point, with a corresponding decrease in width at the rear window.

The body can have a rapidly increasing width at the sloping windshield and an essentially constant height and width at the passenger compartment. Its height and width can decrease toward the end of the body where the rear end joins the passenger compartment to attain a flow around edge that will be as low as possible without significant flow separation at this point as well. The decrease in height and width at the rear end should be gradual, preferably at angles of 15°–20° to avoid here as well the normal separation that can occur as the result of too rapid variations in height and width and the associated increased pressure even when flow around edge is completely eliminated.

To make the front wheel track wider, the body may have a constriction in its width at the transition from the front to the windshield. Such a constriction must of course be gradual enough to prevent the flow from separating at that point and for that part of the constriction at which the width of the body increases to be positioned approximately at the windshield. To prevent increased flow around the lower longitudinal edge of the vehicle and to exploit the basic design where it is most applicable, such a constriction should occur essentially at the top and flow out toward the bottom plate. The essential effect will thus occur at the top of the vehicle, and hence toward the windshield, while the width of the vehicle at the bottom, in the vicinity of the bottom plate, will be more or less constant from the front into the passenger compartment.

When the bottom plate—the bottom of the vehicle—is flat, variations in cross-section will also produce a flow around the bottom edges of the vehicle at the windshield and rear window that will however, be weakened by the surface of the ground or road. This flow can be counteracted by decreasing the distance to ground in front of the windshield and increasing it again at the windshield. These cross-sectional variations are however considerably slighter than the side-to-side cross-sectional variations described in the foregoing. Thus, a depression can be introduced in the bottom plate between the front of the vehicle and the windshield that will be deepest at approximately the front of the windshield.

The corners of the body cross-section can be extensively rounded off in the vicinity of rapid variations in cross-section to allow flow around edge without significant separation. This is especially true of cases in which a relatively small variation in width is selected, permitting a relatively high flow around edge and possibly even weak separation accompanied by correspondingly low eddy formation and drag increase.

The basic concept of the invention will accordingly be realized even just when the width of the body in front of the windshield is less than it is behind the windshield. The advantages of the invention are that the drag on the ideal basic design can be extensively reduced without having to slope the windshield too much and without significantly changing the shape of the passenger compartment. The length of the vehicle can also be kept satisfactorily short. And side-wind sensitivity and lift will be slight.

Figure 2:
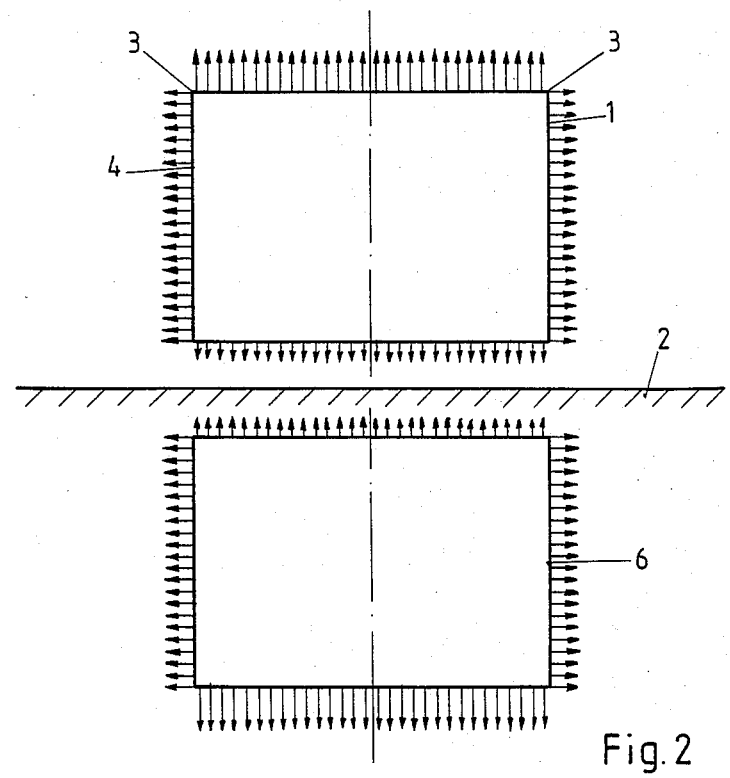
Figure 3:
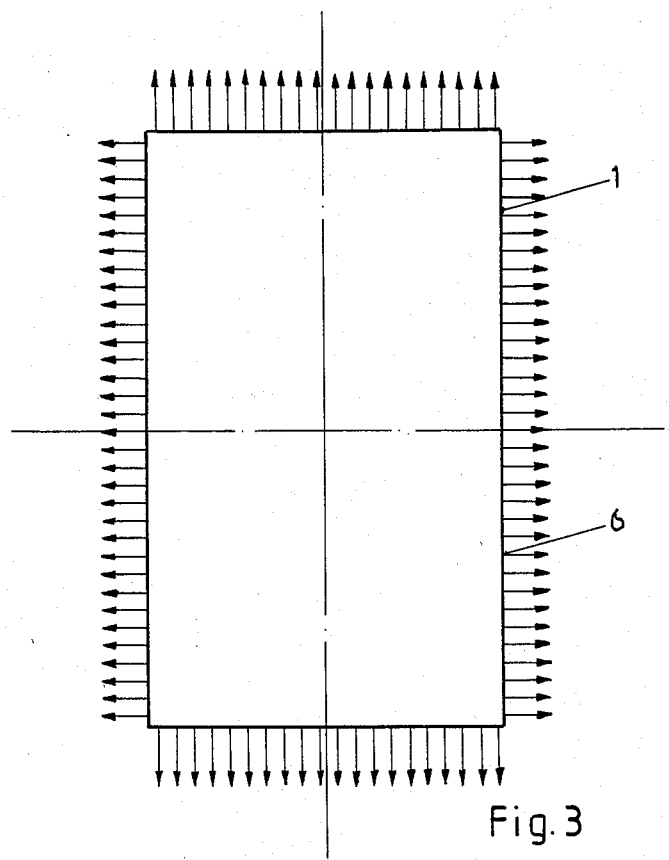
Figure 4B:
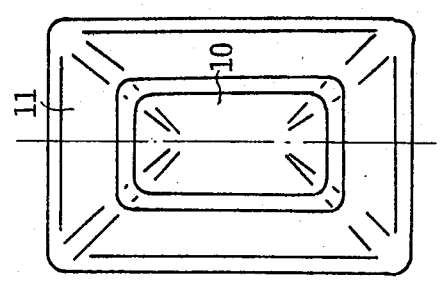
Figure 4A:
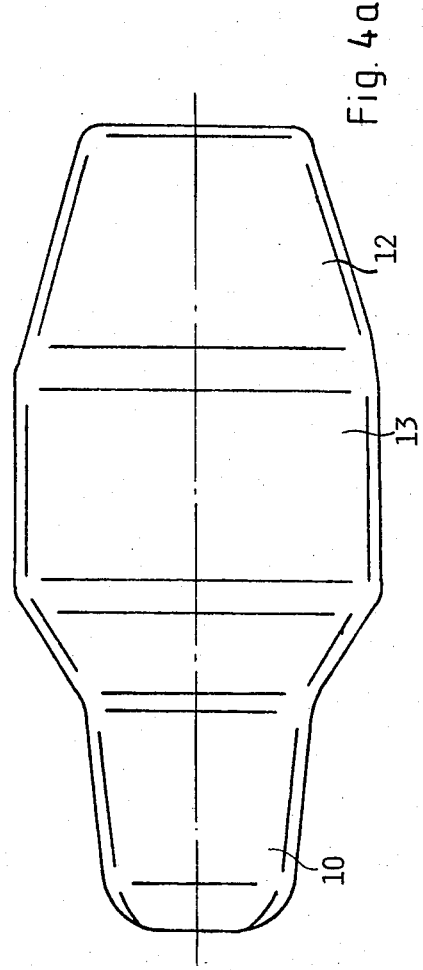
Figure 4C:
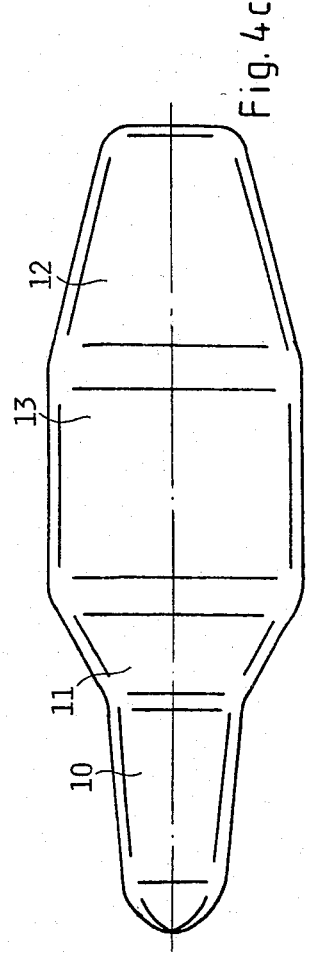
Figure 5:
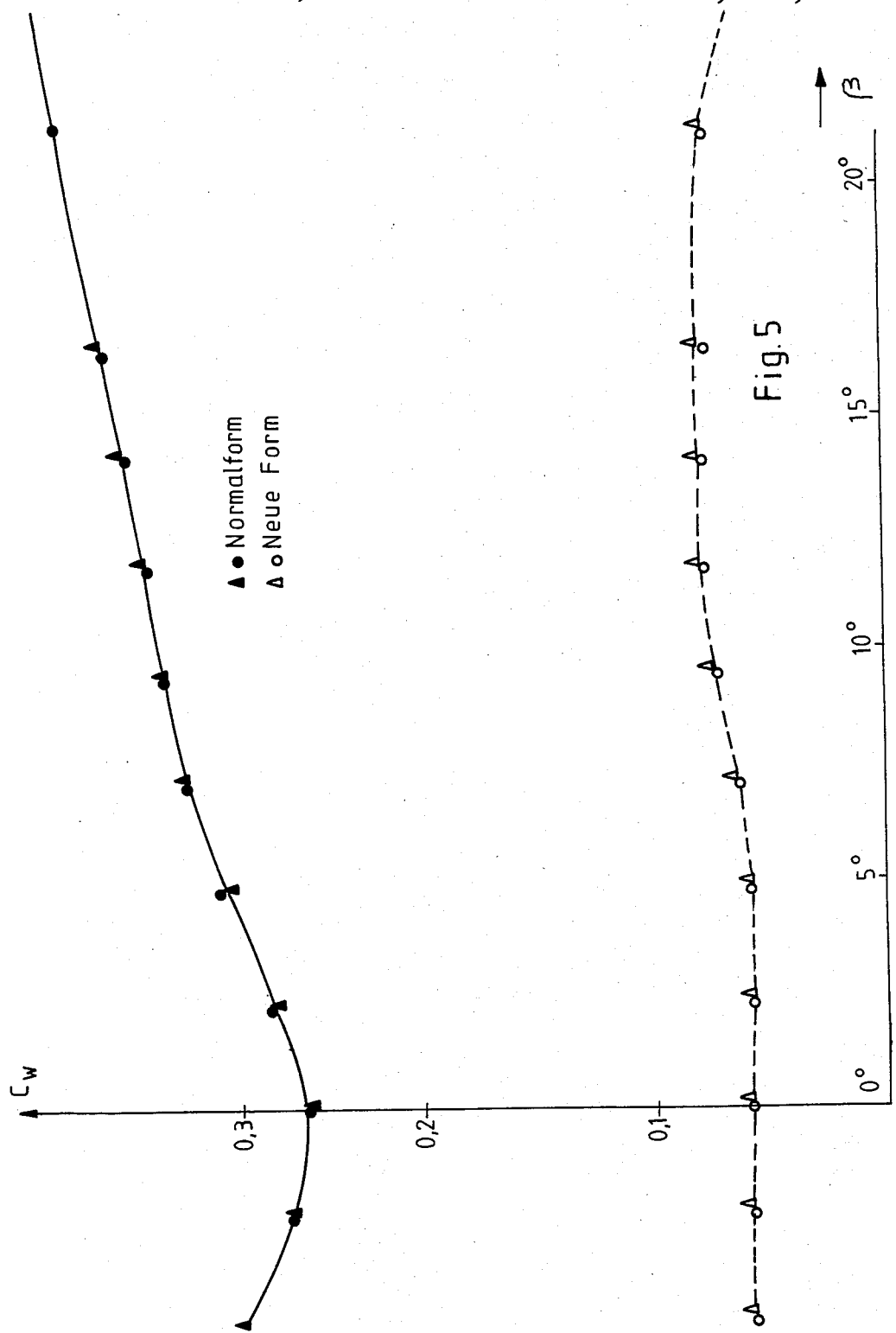
Figure 6B:
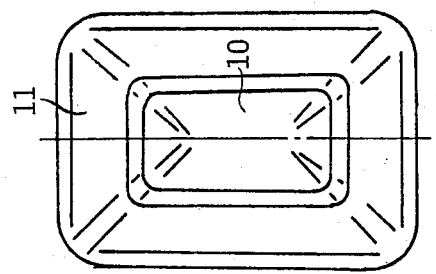
Figure 6A:
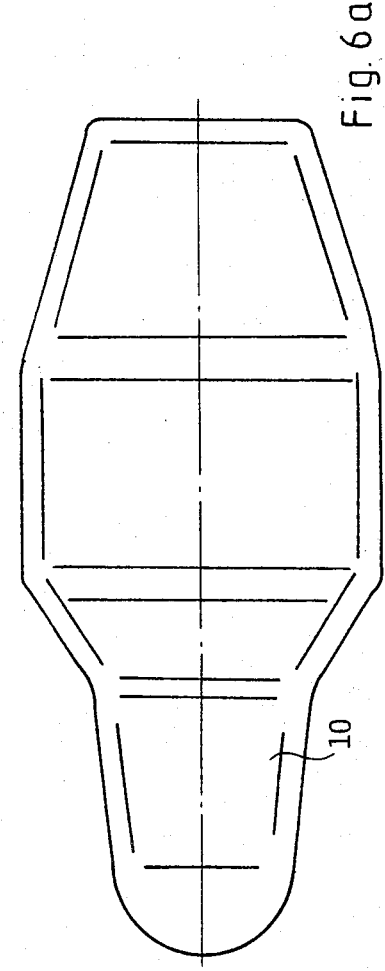
Figure 6C:
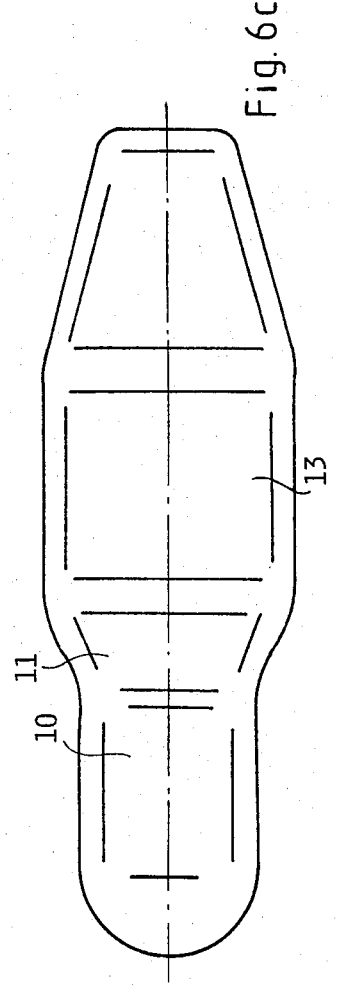
Figure 7B:
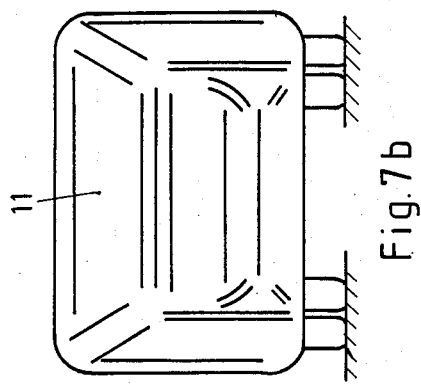
Figure 7A:
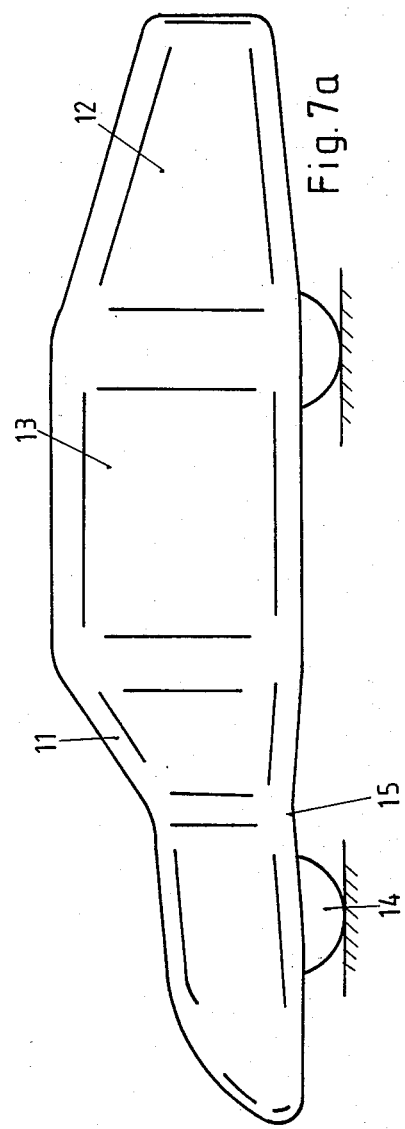
Figure 7C:
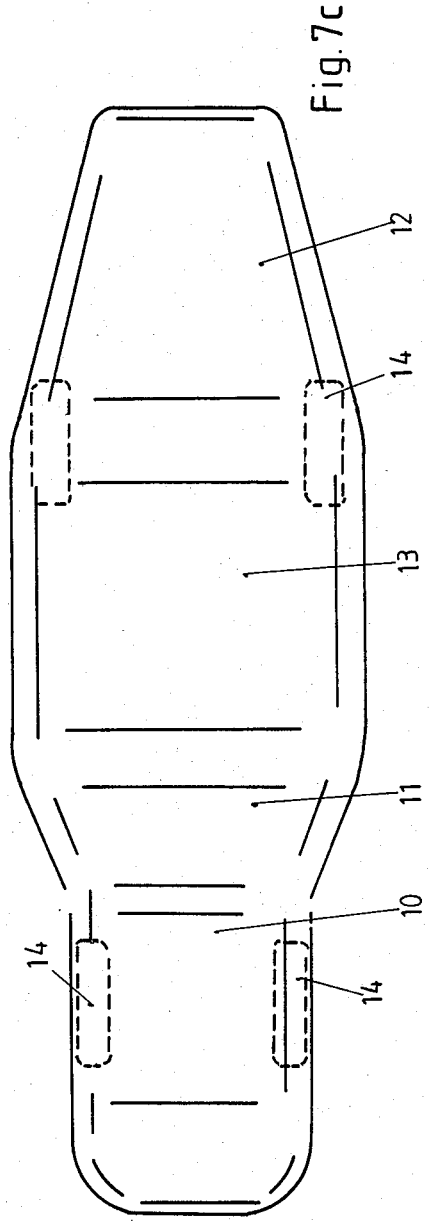

Some examples of embodiments of the invention will now be specified with reference to the drawings, in which FIG. 1 schematically illustrates a rectangular body cross-section with flow separation, FIG. 2 the problem of flow on the cross-section and on a mirror image, FIG. 3 an auxiliary cross-section made up of the cross-section and mirror image in FIG. 2, FIGS. 4 a, b, and c are side, front, and top views of a dual model of a body shape in which flow around edge is practically eliminated, FIG. 5 is a diagram of the coefficient of tangential force over the angle of side slip for a state-of-the-art body shape and for one like that in FIG. 4, FIGS. 6 a, b, and c are side, front, and top views of a dual model of another body embodiment, FIGS. 7 a, b, and c are side, front, and top views of still another body embodiment, and FIGS. 8 a, b, and c are side, front, and top views of still another body embodiment.

FIG. 1 illustrates the formation of the flows around edge and flow separations that increase the coefficient of drag. An ideal rectangular body cross-section 1 is represented above the surface of a road 2. When flow around the body occurs normal to body cross-section 1, a displacement flow will form where the height of the cross-section changes rapidly, essentially at the windshield and rear window. This provokes the current to flow around upper longitudinal edges 3, especially in the vicinity of the walls 4 of body cross-section 1. In so doing, the flow will separate at upper longitudinal edge 3 and form a plane of separation that will roll itself up into an eddy 5. FIG. 1 illustrates something called transverse flow with respect to the current in the vicinity of the windshield. This is flow along a cross-sectional plane that can be constructed by assigning the components of the flow vector that impact on the plane to every point in the plane. The aforesaid spatial separation will occur here, especially when the height of the cross-sectional area changes very rapidly and the corners are not well rounded or even sharp, and the corresponding plane of separation will roll itself up into an eddy 5. Obviously, a flow around upper longitudinal edges 3 will also occur in the opposite direction in the vicinity of the rear window because of the decrease in height that occurs there and will form another eddy.

Associating the variation in width to each change in height should result in only a slight flow around edge without or with only insignificant separation. To obtain these conditions the necessary variation in cross-sectional width must be established for each given change in height. The ideal body shape must be calculated at least approximately. The complexity of the flow process makes it impossible to exactly calculate the field of flow in such a way as to account for the boundary layers, the aforesaid eddy 5, and the stagnation point at the present state of knowledge. What is called the slender-body theory can be utilized to obtain a first approximation. According to this theory, when the longitudinal cross-sectional variations in a slender body are not too rapid, the cross-sectional flow will depend only on the individual cross-section and the rate at which it varies longitudinally and not on the remaining dimensions of the body. It will be sufficient for a first approximation to consider all the body cross-sections as precise rectangles. If friction is also neglected, the result with respect to transverse flow will be the plane potential-theoretical flow problem evident from FIG. 2. A flow with normal components that are always constant will occur at all four sides of the boundary of the rectangle or body cross-section 1, with the magnitude of each normal component proportional to the corresponding variation in the rectangular cross-sectional shape along the length of the vehicle. When the bottom of the vehicle is flat or when the width does not vary longitudinally, the normal component at the bottom or side would therefore equal zero. The normal component of flow at the road illustrated in FIG. 2 would also vanish. This condition can be compensated for by reflecting an equivalent cross-section, mirror image 6, with the same flow conditions around the line representing the surface of the road. If the intensity of the constant normal component on the four sides is random, a flow around the corners of the cross-sectional surface will occur at infinitely high speeds. The flow around the corners will be especially powerful when the cross-section varies in only one direction. In an actual flow, this flow around corner (cross-sectional flow) will lead to a departing eddy surface that will roll itself up into an eddy. To counteract such eddies, a cross-sectional body variation will have to be found for which the flow around corner is as small as possible or at least only large enough as to produce no or only insignificant flow separation. This is done by applying a source distribution to the sides of the cross-section and of mirror image 6 in such a way as to produce the desired distribution of normal components and simultaneously eliminate flow around corner or reduce it to a desired intensity. This problem can no longer be solved analytically. A solution can only be found numerically by means of a two-dimensional panel method. To further idealize the problem without significantly affecting the considerable flow processes at the top of the vehicle, the walls 4 of the cross-section or vehicle can be considered as extending down to the road surface, meaning that the vehicle will have a distance to ground of zero, so that the aforesaid potential problem will be reduced to that illustrated in FIG. 3.

The shape is now a rectangle consisting of body cross-section 1 and mirror image 6. The flow will now emerge at its top and bottom at the same constant normal speed and at its sides with a different constant normal speed. The ratio between the two normal speeds at which no flow around corner occurs will have to be determined. Obviously this speed ratio depends only on the ratio between the sides of the rectangle. The speed ratios can be calculated with the aforesaid panel method or with conformal representation, the rectangle being constructed on a semiplane and the flow conditions being fulfilled in the picture plane. This method can be utilized to design body shapes in accordance with the approximations supplied by the slender-body theory in such a way that no flow around edge will occur at all or will occur only at a desired intensity. A corresponding level of edge rounding can then be selected to eliminate separation or make it insignificant. For body shapes with the presently conventional ratio of height to width of 1:1.2 to 1:1.3, the resulting lateral widening in the vicinity of the windshield will range from 50–150% of the change in height at that point.

A test of the validity of the theory behind the invention has been conducted. Three-component force measurements of a presently conventional body shape with a notchback and of a reference model with a body shape in accordance with the invention were obtained in a wind tunnel. The reference model was designed to eliminate flow around edge, although its edge rounding was the same as on the conventional model. Both models were tested as what are called dual models. FIGS. 4 a, b, and c show the side view, the front view, and the top view respectively of the reference model with a front 10, a windshield 11, and a rear 12. Both models had the same area on the front 10, the same size of passenger compartment 13, and the same length.

FIG. 5 is a graph of the coefficient of tangential force ($C_T$, which equals $C_W$ at $\beta=0$) over the angle $\beta$ of side slip. The solid line represents the results for a conventional body shape and the broken line those for the shape of the reference model in FIGS. 4 a, b, and c. The coefficient of tangential force over the angle $\beta$ of side slip (the effect of side wind) is entered for two different flow-against velocities. Surprisingly, the resistance of the new body shape is only 1/5 that of the conventional shape. The increase in the coefficient of tangential force at the angle $\beta$ of side slip is also significantly less than in the conventional shape, so that the resistance advantage is preserved even with a side wind. Side force is reduced by about ½ with the new body, whereas moment of yaw (in terms of a point at the center of the vehicle) is about the same for both shapes.

The drawbacks of the model illustrated in FIGS. 4 a, b, and c will also be evident however. There is only a relatively small wheel track for the front wheels in the vicinity of front 10. Compromises must accordingly definitely be made at this point that will of course result in a certain amount of flow around edge, which will however be dimensioned to allow no or only slight separation, which will increase the drag coefficient only comparatively little. FIGS. 6 a, b, and c illustrate such a shape, again in the form of a dual model, in a side, front, and top view respectively. Comparison of the dual model in FIGS. 6 a, b, and c with that in FIGS. 4 a, b, and c indicates that the wheel track in the vicinity of the front axle is already wider. Edge rounding in this case has had to be slightly increased in accordance with the now permissible flow around edge. Force measurements were also conducted on this dual model, leading to equally satisfactory results.

Three-component measurements were also conducted with the same shape on a conventional model (not a dual model) in a wind tunnel with a simulated ground surface. FIGS. 7 a, b, and c are a side, front, and top view of what is in this case a single model, with the wheels 14 indicted as well for clarity. A depression 15 in the bottom plate of this model at the transition between front 10 and windshield 11 is of particular significance. It is intended to prevent excessive flow around the lower longitudinal edge of the vehicle where the width increases. These measurements also indicated the good aerodynamic properties of this shape.

FIGS. 8 a, b, and c illustrate a body shape with a constriction 16 in its width at the transition between front 10 and windshield 11. This constriction flows out toward the bottom plate and is therefore effective mainly at the top, in other words at the upper longitudinal edge of front 10 and windshield 11. The various associated lines illustrate the situation.

I claim:

1. A vehicle body particularly for automobiles with advantageous flow characteristics comprising: a passenger compartment having a substantially rectangular cross-section and at least one sloping windshield, said body having a cross-section with width varying in relation to change in height along longitudinal axis of said body at predetermined sections adjacent the passenger compartment, so that only a substantially small flow occurs across an upper longitudinal edge of said body with substantially negligible separation.

2. A vehicle body as defined in claim 1, wherein when the ratio of height to width of the passenger compartment is within the range from 1:1.2 to 1:1.3, the body can be widened laterally at the windshield by substantially 50–150% of the change in height at that point.

3. A vehicle body as defined in claim 1, wherein said body has a rapidly increasing width at the sloping windshield, said body having a substantially constant height and width at the passenger compartment, body height and width decreasing toward the end of the body where the rear end joins the passenger compartment.

4. A vehicle body as defined in claim 3, wherein decrease in height and width at the rear end of the body is at angles substantially within the range of 15°–20°.

5. A vehicle body as defined in claim 3, wherein said body has a constriction in its width at a transition from the front portion to said windshield for widening the front wheel track.

6. A vehicle body as defined in claim 5, wherein said constriction is located substantially at the top and flows out toward the bottom.

7. A vehicle body as defined in claim 1, including a bottom plate between the front of the vehicle and said windshield and having a depression which has maximum depth at substantially the front of the windshield.

8. A vehicle body as defined in claim 1, wherein corners of cross-sections of said body are substantially rounded off in vicinity of rapid variations in cross-section for allowing flow around edges without substantial separation.

* * * * *